(12) United States Patent
Priebe

(10) Patent No.: US 9,770,661 B2
(45) Date of Patent: Sep. 26, 2017

(54) ZONE-BASED POSITIONING FOR VIRTUAL WORLDS

(75) Inventor: Christopher Priebe, Kelowna (CA)

(73) Assignee: Disney Enterprises, Inc., Burbank, CA (US)

( * ) Notice: Subject to any disclaimer, the term of this patent is extended or adjusted under 35 U.S.C. 154(b) by 1038 days.

(21) Appl. No.: 13/197,147

(22) Filed: Aug. 3, 2011

(65) Prior Publication Data

US 2013/0036372 A1 Feb. 7, 2013

(51) Int. Cl.
G06F 3/048 (2013.01)
A63F 13/75 (2014.01)
G06F 3/0481 (2013.01)

(52) U.S. Cl.
CPC .......... *A63F 13/75* (2014.09); *G06F 3/0481* (2013.01); *G06F 3/04815* (2013.01); *A63F 2300/5553* (2013.01); *A63F 2300/5586* (2013.01); *A63F 2300/8082* (2013.01)

(58) Field of Classification Search
CPC .. A63F 13/12; A63F 2300/5553; G06F 3/011; G06F 9/4443; H04L 29/06034
USPC ........................................ 715/757, 706, 744
See application file for complete search history.

(56) References Cited

U.S. PATENT DOCUMENTS

| 8,683,386 | B2* | 3/2014 | Shuster | A63F 13/35 463/30 |
| 2008/0215994 | A1* | 9/2008 | Harrison | A63F 13/10 715/757 |
| 2009/0254843 | A1* | 10/2009 | Van Wie et al. | 715/757 |
| 2009/0259948 | A1* | 10/2009 | Hamilton, II et al. | 715/757 |
| 2010/0082798 | A1 | 4/2010 | Bhogal et al. | |
| 2010/0332997 | A1* | 12/2010 | Hamilton et al. | 715/757 |
| 2011/0185057 | A1* | 7/2011 | Waugaman | A63F 13/12 709/224 |

FOREIGN PATENT DOCUMENTS

| JP | 11120381 | 4/1999 |
| KR | 1020080074860 | 8/2008 |
| WO | 2007040810 A2 | 4/2007 |
| WO | 2008/106196 A1 | 9/2008 |

OTHER PUBLICATIONS

European Search Report for application No. 12178065.4, Nov. 19, 2013.

* cited by examiner

*Primary Examiner* — Joy Weber
(74) *Attorney, Agent, or Firm* — Patterson + Sheridan, LLP

(57) ABSTRACT

Techniques are described for displaying avatars within a virtual environment in a way that avoids an appearance of offensive content. Embodiments of the invention receive a request specifying a first location within the virtual environment to move a first user-controlled virtual object to. A zone encompassing the specified location is then identified and a second location within the identified zone is determined. Embodiments then output the virtual environment for display in a manner that shows the first user-controlled virtual object positioned at the determined second location within the virtual environment.

15 Claims, 8 Drawing Sheets

ZONE-BASED POSITIONING FOR VIRTUAL WORLDS

BACKGROUND

Field of the Invention

Embodiments presented in this disclosure generally relate to computer games and, more particularly, to repositioning avatars in a virtual world to avoid an appearance of offensive content.

Description of the Related Art

A virtual world is a simulated environment in which users may interact with virtual objects and locations of the virtual world. Each user may control a respective avatar through which the user may interact with other users' avatars in the virtual world. An avatar generally provides a graphical representation of an individual within the virtual world environment. Avatars are usually presented to other users as two or three-dimensional graphical representations that resembles a human individual. Frequently, virtual worlds allow multiple users to enter the virtual environment and interact with one another. Virtual worlds are said to provide an immersive environment, as they typically appear similar to the real world and objects tend to follow rules related to gravity, topography, locomotion, physics and kinematics. Of course, virtual worlds can suspend or alter these rules as well as provide other imaginative or fanciful environments. Users typically communicate with one another through their avatars using text messages sent between avatars, real-time voice communication, gestures displayed by avatars, symbols visible in the virtual world, and the like.

Some virtual worlds are described as being persistent. A persistent world provides an immersive environment (e.g., a fantasy setting used as a setting for a role-playing game, or a virtual world complete with land, buildings, towns, and economies) that is generally always available and where events continue to occur regardless of the presence of a given avatar. Thus, unlike more conventional online games or multi-user environments, the virtual world continues to exist and plots and events continue to unfold as users enter (and exit) the virtual world. Virtual environments are presented as images on a display screen and some virtual environment may allow users to record events that occur within the virtual environment.

Many virtual worlds feature some form of content filtering for use in detecting and removing offensive content. For example, a virtual world may include a chat filter configured to detect offensive words in communications within the virtual world and to remove them and/or mask the words. In certain virtual worlds, users are given the ability to ignore or block interactions with particular other users in the virtual world. For example, a first user of the virtual world may choose to block interactions with a second user (e.g., because to offensive comments previously made by the second user). Upon blocking interactions with a particular user in the virtual world, the first user may no longer see communications from the second user and in some cases may no longer see the avatar associated with the second user within the virtual world.

SUMMARY

Embodiments of the invention provide a method, computer-readable storage medium and system. The method, computer-readable storage medium and system include receiving a request to move a first user-controlled virtual object within the virtual environment to a first location. Additionally, responsive to the request, the method, computer-readable storage medium and system include identifying a zone encompassing the first location. Further responsive to the request, the method, computer-readable storage medium and system include determining a second location within the identified zone. The method, computer-readable storage medium and system also include outputting the virtual environment for display in a manner showing the first user-controlled virtual object positioned at the determined second location within the virtual environment.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
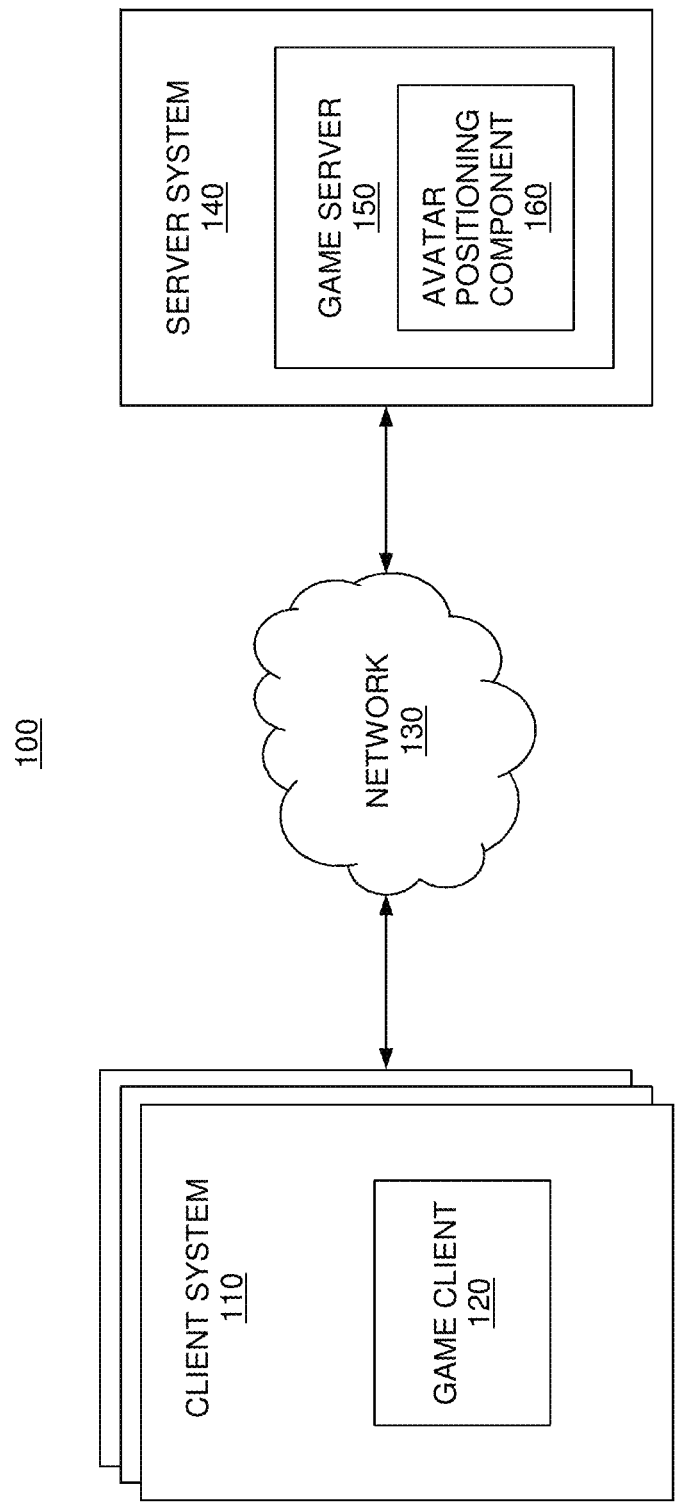
FIG. 1 is a block diagram illustrating a system configured to operate an avatar positioning component, according to one embodiment of the present invention.

Generally speaking, avatars within a virtual environment may interact with each other in various ways. For instance, a number of users may work together to organize their avatars into various formations within the virtual world, such that the avatars are arranged to give the appearance of various words or shapes. As an example, a group of users could position their avatars such that the arrangement of avatars spells out the words "Happy B-Day!" As another example, a group of users could position their avatars such that the avatars form a smiley face in the virtual world. Such activity can be beneficial for the users and the virtual world, as it encourages creativity amongst the users and provides a fun activity for users to participate in within the virtual environment.

However, such positioning techniques may also be used by malicious users to create offensive content within the virtual world. That is, malicious users could organize their avatars in ways which spell out offensive words or draw offensive symbols within the virtual world. This may be particularly problematic in virtual worlds which are free to play, as a single user may use automation techniques to create and control a large number of avatars in such virtual worlds without incurring substantial costs. Additionally, traditional content filtering techniques may be unable to detect such offensive content, as the offensive content is not explicitly created content (e.g., a chat message, an avatar name, etc.) in the virtual world, but rather is implicit in the arrangement of a plurality of avatars within the virtual world. Nonetheless, the offensive content may be readily apparent when viewed by users of the virtual world.

Accordingly, embodiments of the present invention generally provide techniques for displaying user-controlled virtual objects (e.g., avatars) within a virtual environment in a way that avoids an appearance of offensive content. Embodiments receive a request from a first user specifying a first location within the virtual environment to move a first user-controlled virtual object to. Here, the first user-controlled virtual object is an object controlled by the first user in the virtual world. A zone encompassing the specified location is then identified. That is, the virtual environment may be divided into a number of different zones, with each of the zones corresponding to a separate portion of the virtual environment and with every location within the virtual environment corresponding to a single one of the zones. Upon identifying the zone that contains the specified location, embodiments determine a second location within the identified zone at which to display the first user-controlled virtual object at to a second user. In particular embodiments, the second location is determined randomly or pseudo-randomly. In other embodiments, the second location is selected from a predetermined set of locations within the identified zone. Embodiments then output the virtual environment for display to the second user, with the first user-controlled virtual object associated with the first user is displayed as positioned at the determined second location within the virtual environment. Advantageously, by adjusting the position at which the first avatar is displayed to other users of the virtual world, embodiments prevent the first avatar from participating in any formations that give the appearance of offensive content.

As used herein, a user-controlled virtual object generally represents any object within a virtual environment. Examples of such a user-controlled virtual object include, without limitation, avatars controlled by users of the virtual environment, furniture placed by users within the virtual environment (e.g., within a virtual house), exchangeable objects within the virtual environment (e.g., an umbrella that users may hold or trade with other users), and so on. As such, embodiments may be used to prevent users from arranging any virtual objects within the virtual environment in ways that create offensive shapes and/or words.

FIG. 1 is a block diagram illustrating a system configured to operate an avatar positioning component, according to one embodiment of the present invention. As shown, the system 100 includes a plurality of client systems 110 connected to a server system 140 via a network 130. Each of the client systems 110 is configured to operate a game client 120. Examples of the client systems 110 include, without limitation, console gaming systems (e.g., the Microsoft Xbox 360®, the Sony Playstation® 3, etc.), handheld gaming systems (e.g., the Nintendo 3DS™ and DS™, the Sony PSP®, etc.), personal computer gaming systems and so on. Furthermore, although the depicted embodiment shows only a single server system 140, such a depiction is for illustrative purposes only. Moreover, one of ordinary skill in the art will quickly recognize that any number of physical and/or logical server systems may be used in accordance with embodiments of the invention.

The server system 140 is configured to operate a game server 150, which includes an avatar positioning component 160. Generally, the game server 150 is configured to receive connections from users (e.g., via the game clients 120) and to manage a virtual world and interactions between the users within the virtual world. The avatar positioning component 160 is generally configured to manage the positions at which the avatars are displayed within the virtual world. For example, the avatar positioning component 160 may receive a request from a first user in the virtual world to move the first user's avatar to a specified location. As a result, the avatar positioning component 160 could output for display the first user's avatar at the specified location (e.g., through communications with the game client 120 on the client system 110 associated with the first user). Doing so ensures that the first user sees his avatar positioned at the location that the first user specified. Additionally, although the avatar positioning component 160 is shown as residing within the game server 150 on the server system 140 in the depicted embodiment, such a depiction is without limitation and is for illustrative purposes only. Moreover, it is broadly contemplated that the avatar positioning component 160 could reside elsewhere on the server system 140, on the client systems 110, on another computer system or on a combination of the aforementioned computer systems.

However, for other users of the virtual world, the avatar positioning component 160 may display the first user's avatar at a different position within the virtual world. For instance, the avatar positioning component 160 may determine a zone which encompasses the specified location. That is, the virtual environment may be divided into a plurality of zones, such that every location within the virtual environment corresponds to one of the zones. Generally, such zones do not overlap with each other and may be of any shape and size. In one embodiment, the virtual environment is divided into a number of equally-sized rectangular zones. In other embodiments, the virtual environment is divided into zones of different shapes and sizes.

Upon determining the zone that encompasses the specified location to which the first user wishes to move his avatar, the avatar positioning component 160 selects a second location within the zone at which to display the first user's avatar to other users. For instance, the avatar positioning component 160 could randomly select the second location within the zone that is different from the specified location. As another example, the avatar positioning component 160 could select the second location from a predefined set of locations within the zone. Upon selecting the second location within the zone, the avatar positioning component 160 outputs for display the first user's avatar at the determined second location to the other users of the virtual world (e.g., through communications with game clients 120 on the client systems 110 associated with the other users). Advantageously, displaying the first user's avatar at a different position prevents the first user from positioning his avatar into a formation of avatars that gives the appearance of offensive content. Furthermore, by positioning the first user's avatar within the same zone of the virtual environment, embodiments ensure that the second location at which the first user's avatar is displayed is relatively close in proximity to the location specified by the first user.

In one embodiment, the avatar positioning component 160 pseudo-randomly selects the second location. For instance, the avatar positioning component 160 could first identify a number of prohibited areas within the zone. As an example, the provider of the virtual world may wish to prevent certain areas of the virtual environment from becoming cluttered with avatars. For instance, a virtual environment could contain a door which users can access to enter a particular area within the virtual world. As such, the virtual world provider may wish to prevent users from stacking on top of the door with their avatars, thus hiding it from the view of other users and/or preventing the other users from accessing the door. Accordingly, once the prohibited areas are determined, the avatar positioning component 160 may select (e.g., randomly) a location that is within the zone but is not included within any of the prohibited areas. Advantageously, doing so enables the provider of the virtual world to prevent certain areas of the virtual world from becoming crowded with avatars while still ensuring that users cannot create any offensive content through the formation of their avatars.

In some embodiments, it may be desirable for users to see the actual position of particular user's avatars. For instance, if a second user is participating in a group activity with a number of other users that the second user trusts, it may be desirable for the second user to be able to see the actual locations of the other users' avatars (i.e., rather than a different location for the avatars determined by the avatar positioning component 160). As an example, if the second user is interacting with the other users in order to create a non-offensive avatar formation, the second user may not wish for the avatar positioning component 160 to adjust the displayed positions of the other users' avatars. However, the second user may still wish to avoid seeing offensive formations of avatars, made by other avatars that the second user does not know and/or does not trust. Accordingly, in such an embodiment, the avatar positioning component 160 may determine which other users the second user has a trusted relationship with, e.g., by determining which users are on a friends list of the second user.

As another example, the avatar positioning component 160 could analyze the network addresses associated with the users of the virtual environment to determine relationships between the users. For example, the avatar positioning component 160 could determine that a trusted relationship exists between three users, because all three users all have connected to the virtual world using the same internet protocol ("IP") address. For instance, a family connecting to the virtual world using a single internet connection would all be associated with the same external IP address. Additionally, the avatar positioning component 160 may analyze the IP addresses associated with the users to determine similarities between the IP addresses. For example, the avatar positioning component 160 could determine a relationship exists between users of the virtual world when the IP addresses of the users all share a common subnet. Upon determining that the trusted relationship exists with particular other users, the avatar positioning component 160 may output for display the other users' avatars at their actual positions within the virtual world. Advantageously, such an embodiment allows users to view the actual locations of trusted avatars within the virtual world so that the users can still participate in activities involving avatar formations with the trusted users. Furthermore, such an embodiment still protects users from offensive formations of avatars created by non-trusted users within the virtual environment.

Figure 2:
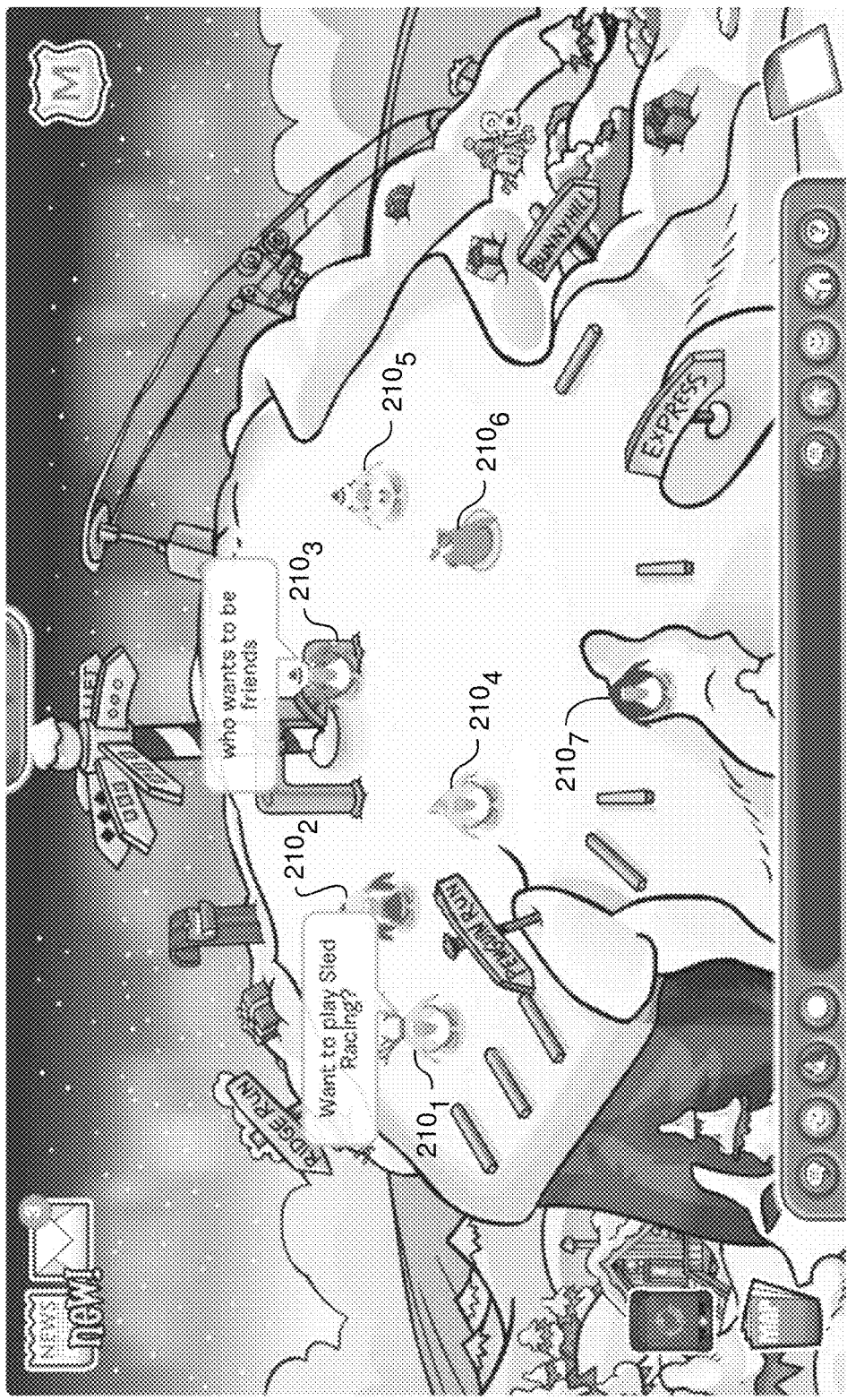
FIG. 2 is a screenshot of a virtual environment, according to one embodiment described in the present disclosure.

FIG. 2 is a screenshot of a virtual environment, according to one embodiment described in the present disclosure. As shown, the screenshot 200 includes a plurality of avatars 210 positioned at various locations within a virtual environment. In the depicted embodiment, each avatar 210 is a graphical representation representing a respective user of the virtual world. Furthermore, each avatar could be associated with a respective avatar name. As an example, the avatar $210_1$ could be associated with the avatar name "User Name 1" while the avatar $210_3$ could be associated with the avatar name "User Name 3". Additionally, the depicted embodiment shows several of the avatars 210 interacting via chat bubbles. For instance, the avatar $210_1$ is shown asking if any of the other avatars "Want to play Sled Racing?" Of course, the screenshot 200 only shows one virtual world in which embodiments of the present invention may be used. More generally, it is broadly contemplated that embodiments may be used with any sort of virtual world that can be configured with an avatar positioning component 160.

As discussed above, a group of users may interact with each other to position their respective avatars 210 into various formations. In many situations, such behavior is beneficial, as it promotes creative thinking and interactions between the users of the virtual world. However, one difficulty faced by virtual world providers is that malicious users may organize their avatars into formations that give the appearance of offensive content (i.e., an offensive word(s) or an offensive image). This is particularly problematic in virtual worlds that are free to play, as a single user could use automation techniques to create and control a plurality of avatars within the virtual world. Furthermore, such offensive formations may go undetected by conventional content filtering tools, as they are not explicitly-defined offensive content (e.g., as an offensive chat message would be). As such, a conventional text filter would not be able to detect an offensive word spelled out by a formation of avatars, even though such a word could easily be seen by users of the virtual world.

Figure 3:
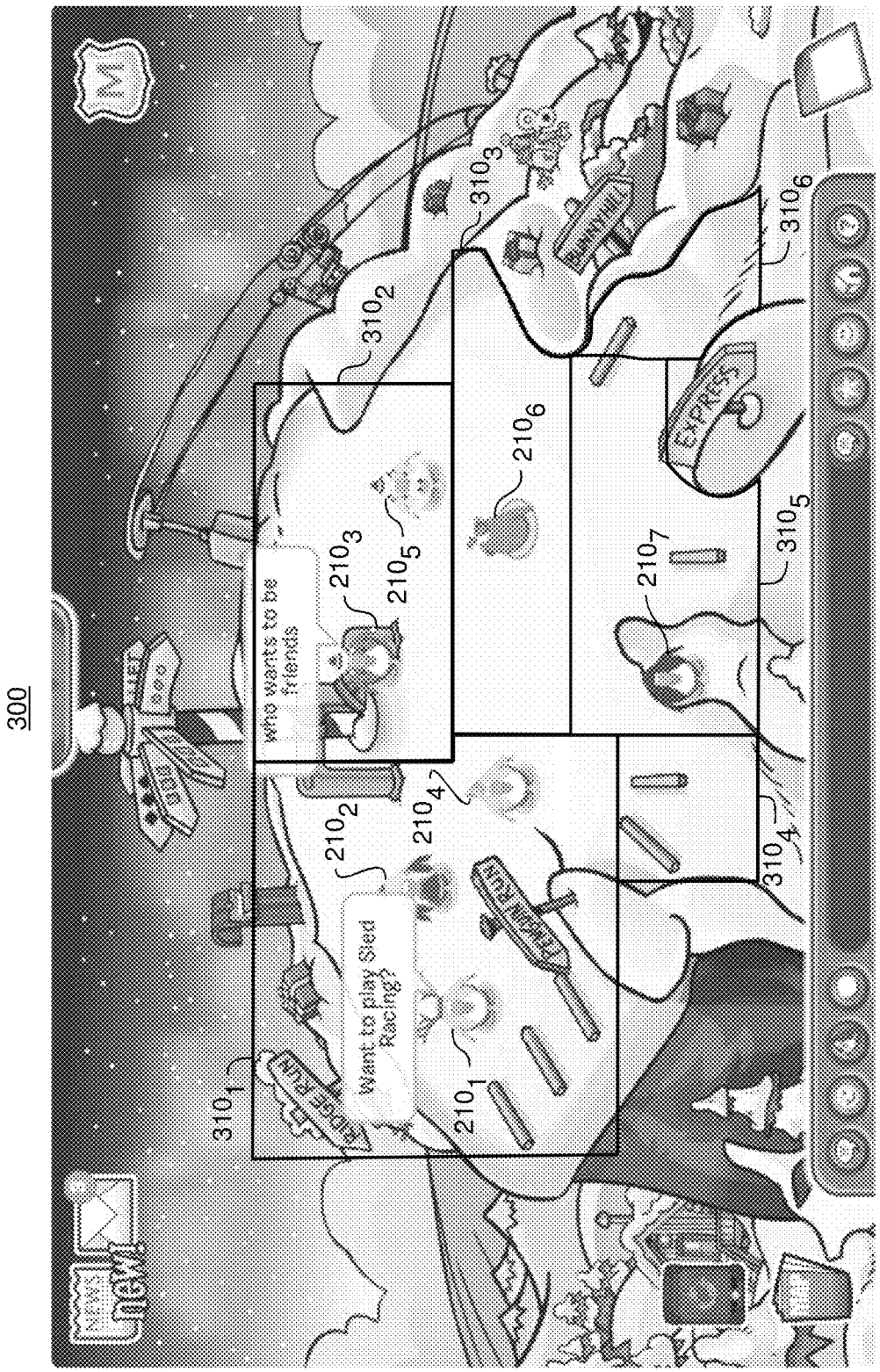
FIG. 3 is a screenshot of a virtual environment divided into a plurality of zones, according to one embodiment described in the present disclosure.

As such, embodiments of the present invention may divide the virtual environment into zones and adjust the position at which other avatars are displayed based on these zones. An example of this is shown in FIG. 3, which is a screenshot of a virtual environment divided into a plurality of zones, according to one embodiment described in the present disclosure. As shown, the screenshot 300 includes a plurality of zones 310. Of note, although shown for illustrative purposes in FIG. 3, the zones 310 are typically not visible to users of the virtual world (although they may be in some embodiments). Generally, the virtual environment is divided up into zones 310 that do not overlap with each other. In one embodiment, the entire virtual environment is divided into zones 310, such that every location within the virtual environment is encompassed by a single zone 310. In other embodiments, only certain areas of the virtual environment may be divided into zones 310.

In a particular embodiment, the zones 310 are pre-defined by an administrator of the virtual world. For example, the avatar positioning component 160 could provide a graphical user interface through which the administrator may draw the zones 310 in the virtual environment. As another example, the administrator could define the zones in a coordinate-based map file that could then be read by the avatar positioning component 160. In other embodiments, the avatar positioning component 160 automatically generates the zones 310. For example, in such embodiments, the avatar positioning component 160 could divide the virtual environment into a number of equal-sized, rectangular zones. More generally, any technique for creating the zones consistent with the functions described herein may be used.

Figure 4:
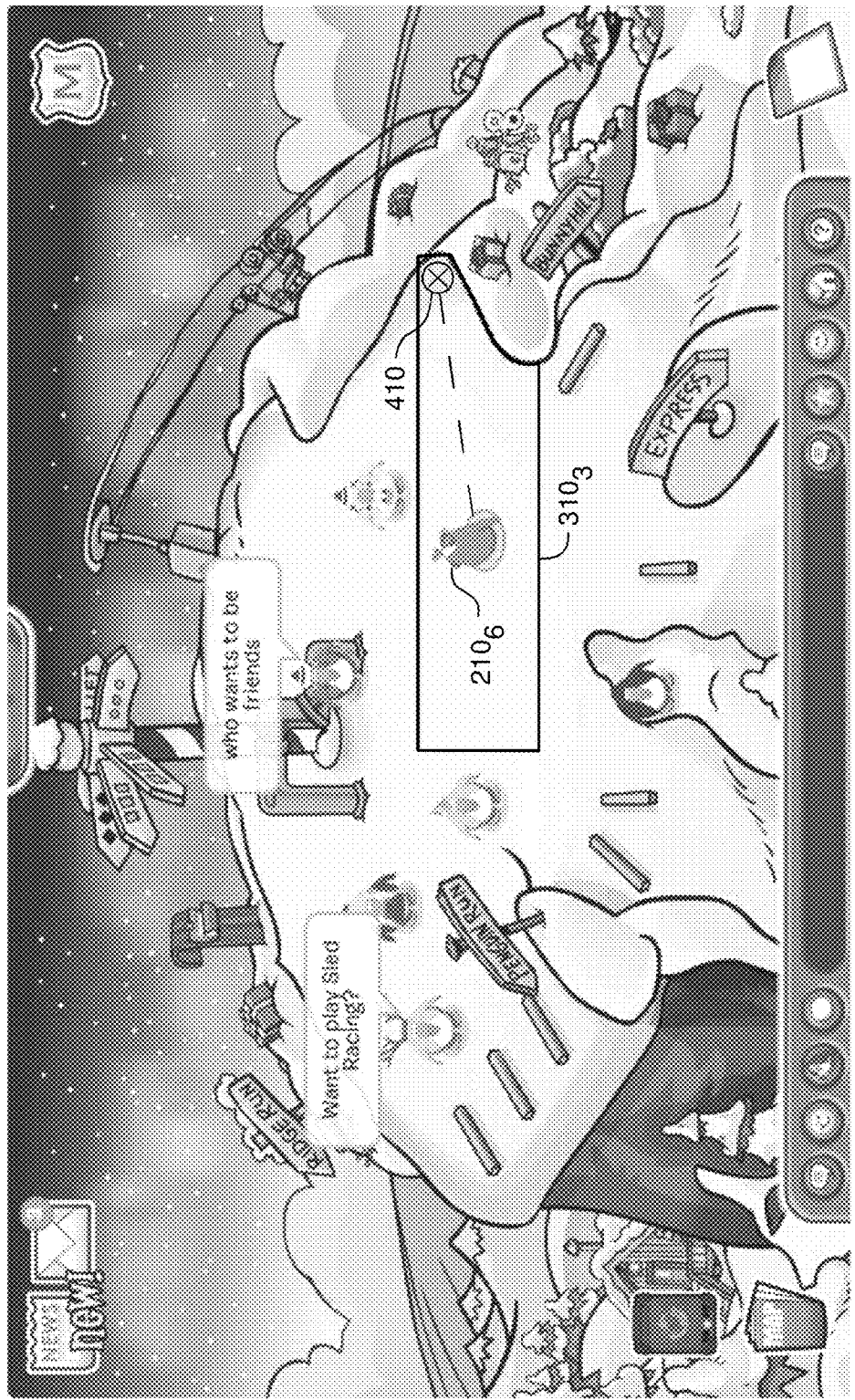
FIG. 4 is a screenshot of a virtual environment illustrating a request to reposition an avatar, according to one embodiment described in the present disclosure.

As discussed above, embodiments may use the zones 310 to adjust the position at which various avatars are displayed within the virtual world. For instance, embodiments may determine such an adjusted display position for an avatar in response to a move request from the user associated with the avatar. An example of such movement is illustrated in FIG. 4, which shows a screenshot of a virtual environment illustrating a request to reposition an avatar, according to one embodiment described in the present disclosure. As shown, the screenshot 400 depicts the avatar $210_6$ moving to the location 410 within the virtual environment. Of note, although the location 410 is marked with an "X" for illustrative purposes in the screenshot 400, such a marking would typically not be visible to all the users of the virtual world.

Additionally, as shown, the avatar $210_6$ is located within the zone $310_3$. Such a movement request may be generated, for example, responsive to the user clicking on the location 410 in a game client 120. As another example, the movement request may be based on the user accessing a particular representation of a location within the virtual world. For instance, the game client 120 may provide a predefined textual list of locations within the virtual world. When the user selects one of the textual location descriptions, such a game client 120 could be configured to move the user's avatar to the described location within the virtual world. Furthermore, the avatar positioning component 160 is configured to not adjust the position of the avatar for the user associated with the avatar. As such, the game client 120 may display the user's avatar at the exact location specified by the user. Of course, these examples are provided for illustrative purposes only and one of ordinary skill in the art will recognize that any number of other techniques may be used for moving avatars within the virtual world.

Upon receiving the request to move the avatar $210_6$ to the specified location 410, the avatar positioning component 160 may determine a second location within the zone $310_3$ at which to display the avatar $210_6$ to other users of the virtual world. In one embodiment, the avatar positioning component 160 determines the second location by randomly selecting another location within the zone $310_3$. In another embodiment, the avatar positioning component 160 pseudo-randomly determines the second location within the zone $310_3$. For example, the avatar positioning component 160 could first identify any prohibited areas within the zone $310_3$. As discussed above, the provider of the virtual world may wish to limit avatar congestion around certain areas of the virtual world (e.g., a door to a particular area of the virtual world). Continuing the example, once any prohibited areas within the zone $310_3$ are determined, and then randomly select a location within the zone $310_3$ that does not fall within any of the prohibited areas. In other embodiments, the avatar positioning component 160 selects the second location from a predefined list of locations within the zone $310_3$. Such predefined locations may be defined, for example, by an administrator of the virtual world.

Figure 5:
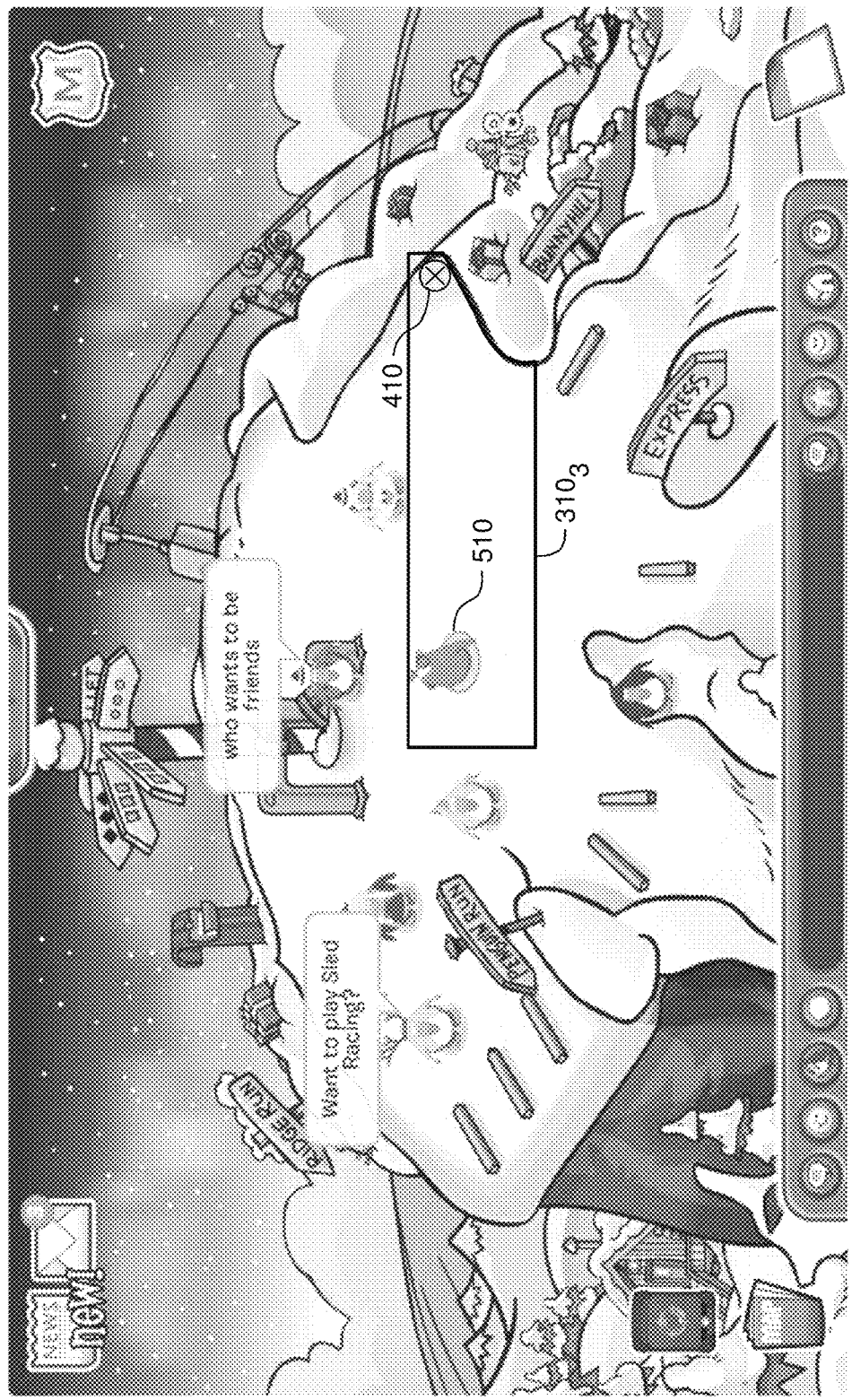
FIG. 5 is a screenshot of a virtual environment configured with an avatar positioning component, according to one embodiment described in the present disclosure.

In any event, upon determining the second location, the avatar positioning component 160 may display (or output for display by a game client 120) the avatar $210_6$ at the second location within the virtual world to other users of the virtual world. An example of this is shown in FIG. 5, which illustrates a screenshot of a virtual environment configured with an avatar positioning component, according to one embodiment described in the present disclosure. Of note, the screenshot 500 illustrates a view of the virtual world from the perspective of the other users of the virtual world (as opposed to the perspective of the user associated with the avatar $210_6$). As shown, the screenshot 500 illustrates the zone $310_3$ and the specified location 410. However, although the user associated with the avatar $210_6$ has moved his avatar to the specified location 410, the avatar is depicted at the determined second location 510 within the virtual world to the other users of the virtual world.

Advantageously, by displaying the avatar $210_6$ at the second location 510, embodiments prevent malicious users from arranging pluralities of avatars into formations that give the appearance of offensive content. That is, because a particular user will see other users' avatars at different locations within the virtual world than they are actually located, embodiments prevent any such formations of avatars from forming. Additionally, by using zones 310 to select the second location 510 that is in close proximity to the specified location 410 within the virtual world, embodiments ensure that the avatars are not displayed far away from their actual position. This, in turn, may ensure that interactions between the second avatar and the other avatars are not affected by the adjustment in the displayed position of the second avatar. Furthermore, because each user sees his avatar positioned at the specified location (rather than at the determined second location), embodiments ensure that users will not be confused by any adjusted positioning of their own avatars.

As an additional advantage, by allowing the zones to be defined by the administrators of the virtual world, embodiments allow for precise play interaction within the virtual world. For instance, an administrator could create a small number of zones in areas where location matters to the users. As an example, the administrator could create only a small number of zones near a snow fort during a snow ball fight, so as to avoid confusion by the users (e.g., resulting from avatars appearing in random places during the snowball fight). As another example, an administrator could create a smaller zone near a prop on a stage, to ensure that users specifying locations near the prop are always displayed near the prop, even if they are displayed in a different location than specified. Doing so ensures the speech of the avatars near the prop makes sense in the context of the location. However, in broader areas like open fields within the virtual world, the administrators could create larger zones, as these open fields within the virtual world are key targets for malformed alignments of avatars.

Figure 6:
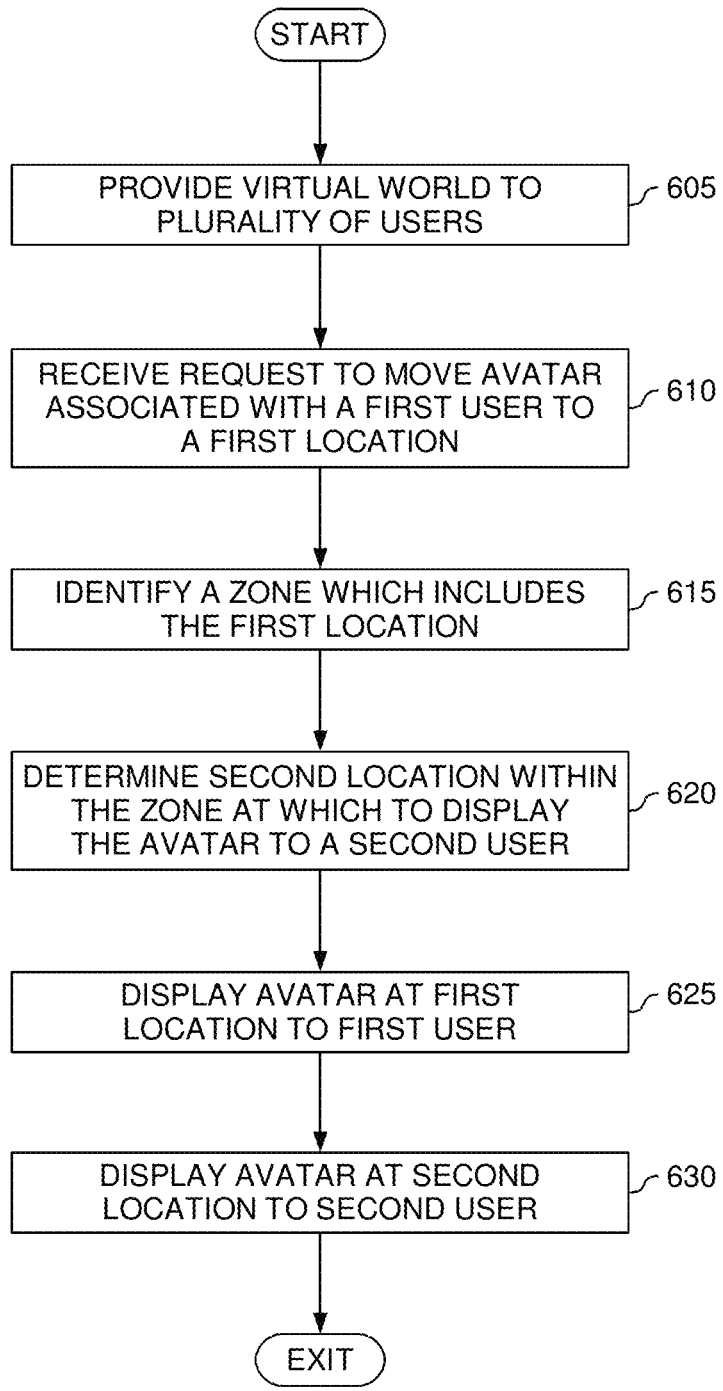
FIG. 6 is a flow diagram illustrating a method for displaying avatars in a virtual environment, according to one embodiment described in the present disclosure.

FIG. 6 is a flow diagram illustrating a method for displaying avatars in a virtual environment, according to one embodiment described in the present disclosure. As shown, the method 600 begins at step 605, where a game server 150 provides a virtual world to a plurality of users, with each user controlling a respective avatar within the virtual world. The avatar positioning component 160 within the game server 150 then receives a request to move a first avatar associated with a first user to a first location within the virtual world (step 610). Such a request could be generated by a game client 120, e.g., responsive to a user clicking on the specified first location within the game client 120.

Upon receiving the request, the avatar positioning component 160 identifies a zone encompassing the specified first location (step 615). As discussed above, a virtual environment may be divided into a plurality of zones, such that each location within the virtual environment corresponds to one of the zones. Upon identifying the zone which includes the first location, the avatar positioning component 160 determines a second location within the identified zone at which to display the first avatar to a second user (step 620). As discussed above, the second location may be determined in a number of different ways, e.g., randomly, pseudo-randomly, selected from a pre-defined set of locations, and so on.

Upon determining the second location, the avatar positioning component 160 outputs the virtual environment for display to the first user (e.g., using the game client 120 associated with the first user), such that the first avatar of the first user is displayed at the specified location (step 625). Additionally, the avatar positioning component 160 outputs the virtual environment for display to the second user (e.g., using the game client 120 associated with the second user), such that the first avatar of the first user is displayed at the second location (step 630). Once the virtual environment is displayed to the users, the method 600 ends. Advantageously, adjusting the position at which the first user's avatar is displayed to the second user prevents the first user from positioning his avatar into a formation alongside other avatars that gives the appearance of offensive content. Furthermore, by displaying the first user's avatar at the specified position where the first user moved the avatar, embodiments prevent any confusion on the part of the first user (i.e., confusion caused by the first avatar appearing to travel to the second location, rather than the specified location).

Additionally, as discussed above, in a particular embodiment the avatar positioning component 160 could reside on client systems (e.g., within the game client 120). In such an embodiment, the avatar positioning component 160 for the second user could receive the actual position of the first avatar (e.g., the location specified by the first user) from a game server and then determine the second position at which to display the first avatar based on a zone containing the specified location for the first avatar. Advantageously, by including the avatar positioning component 160 within the game client 120, embodiments may allow the client to make use of locally-stored trust-related information, such as a list of known friends within the virtual world and a predefined safety level for the second user.

In an alternate embodiment, the avatar positioning component 160 may reside on both the client systems and the game server system, with each instance of the avatar positioning component 160 being responsible for certain operations. For instance, the avatar positioning component 160 on the server system could determine a zone containing the specified position for the first avatar and transmit the determined zone information to the game client for the second user (i.e., rather than transmitting the specified position). An avatar positioning component 160 within the game client for the second user could then select a position within the received zone at which to display the first avatar.

Figure 7:
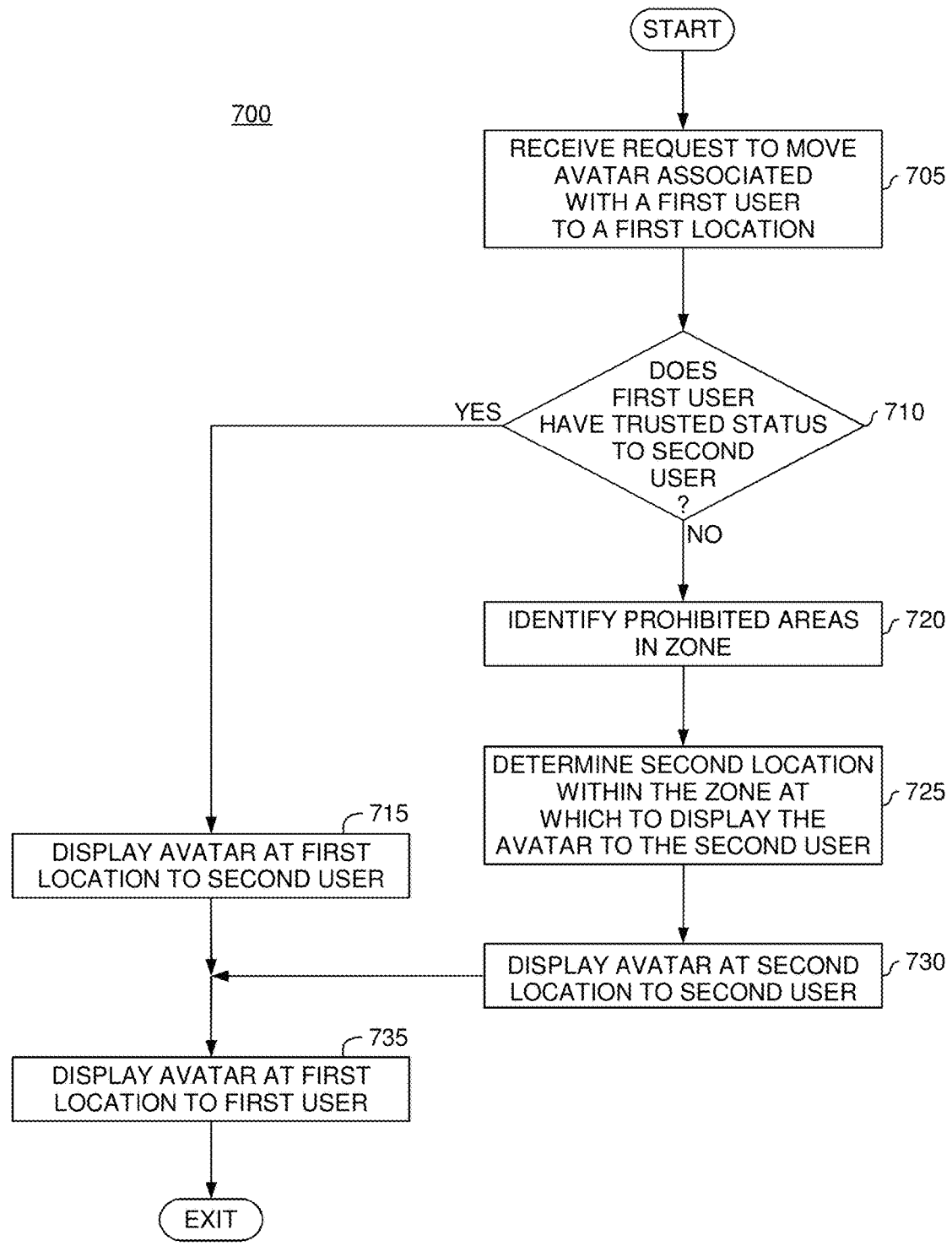
FIG. 7 is a flow diagram illustrating a method for displaying avatars in a virtual environment, according to one embodiment described in the present disclosure.

FIG. 7 is a flow diagram illustrating a method for displaying avatars in a virtual environment, according to one embodiment described in the present disclosure. As shown, the method 700 begins at step 705, where the avatar positioning component 160 receives a request to move a first avatar associated with a first user to a first location with a virtual environment. Upon receiving the request, the avatar positioning component 160 determines whether the first user has a trusted status for a second user (step 710). For example, the avatar positioning component 160 could determine whether the first user appears on a friends list of the second user within the virtual world. As another example, the second user could maintain a separate list of trusted users within the virtual world and the avatar positioning component 160 could determine whether the first user appears on such a list.

Upon determining the first user has a trusted status for the second user, the avatar positioning component 160 displays (or outputs for display using a game client 120) the first avatar at the specified first location to the second user (step 715) and similarly displays the first avatar at the specified first location to the first user (step 735), after which point the method 700 ends. That is, in the depicted example, the avatar positioning component 160 does not adjust the position at which the first avatar is displayed to the second user if the first user has a trusted status to the second user. Doing so enables the first user and the second user to participate in activities together within the virtual world, such as creating non-offensive avatar formations with their avatars.

On the other hand, if the avatar positioning component 160 determines the first user does not have a trusted status with the second user, the avatar positioning component 160 identifies a zone encompassing the specified location within the virtual environment and further identifies any prohibited areas within the zone (step 720). As discussed above, in certain virtual environments, a virtual world provider may wish to prevent certain areas (e.g., a door used to access another area of the virtual world) from becoming cluttered with a high density of avatars. As such, the avatar positioning component 160 in the depicted embodiment is configured to identify these prohibited areas within the zone and to determine a second location within the zone that is not within any of the prohibited areas at which to display the first user's avatar to the second user (step 725). Once the second location is determined, the avatar positioning component 160 displays the first avatar to the second user at the determined second location (step 730). However, in such an embodiment, the avatar positioning component 160 still displays the first user's avatar at the first location specified by the first user (step 735), so as to prevent any confusion and frustration on the part of the first user. Once the avatar is displayed to both users, the method 700 ends.

Figure 8:
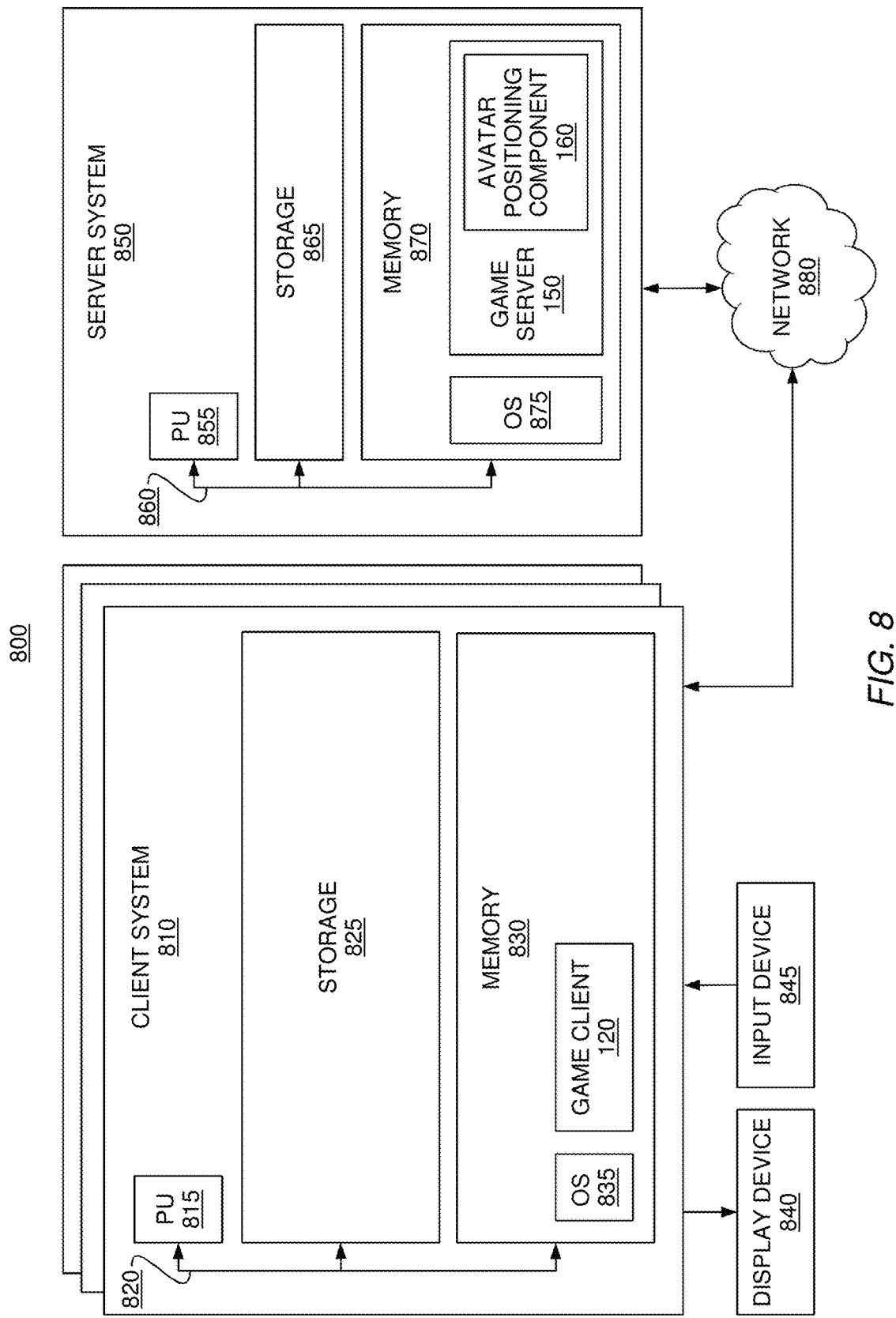
FIG. 8 is a block diagram illustrating a system configured to operate an avatar positioning component, according to one embodiment described in the present disclosure.

FIG. 8 is a block diagram illustrating a system configured to operate an avatar positioning component, according to one embodiment described in the present disclosure. As shown, the system 800 includes a plurality of client systems 810 and a server system 850, communicatively coupled via a network 880. In one embodiment, the client systems 810 may include existing computer systems, e.g., desktop computers, server computers, laptop computers, tablet computers, gaming consoles, hand-held gaming devices and the like. The client systems 810 illustrated in FIG. 8, however, are merely examples of computer systems in which embodiments of the present invention may be used. Embodiments of the present invention may be implemented differently, regardless of whether the computer systems are complex multi-user computing systems, such as a cluster of individual computers connected by a high-speed network, single-user workstations, or network appliances lacking non-volatile storage. Moreover, it is explicitly contemplated that embodiments of the invention may be implemented using any device or computer system capable of performing the functions described herein.

As shown, each client system 810 includes, without limitation, a processor 815, which obtains instructions and data via a bus 820 from a memory 830 and storage 825. Processor 815 is a programmable logic device that performs instruction, logic, and mathematical processing, and may be representative of one or more CPUs. Storage 825 is representative of hard-disk drives, flash memory devices, optical media and the like. Generally, the storage 825 stores application programs and data for use by the client system 810.

The client systems 810 are operably connected to the network 880, e.g., via network interfaces.

The memory 830 is any memory sufficiently large to hold the necessary programs and data structures. Memory 830 could be one or a combination of memory devices, including Random Access Memory, nonvolatile or backup memory (e.g., programmable or Flash memories, read-only memories, etc.). In addition, memory 830 and storage 825 may be considered to include memory physically located elsewhere; for example, on another computer coupled to the client system 810 via bus 820. The memory 830 includes a game client 120 and an operating system ("OS") 835. Operating system 835 is software used for managing the operation of the client system 810. Examples of OS 835 include UNIX, versions of the Microsoft Windows® operating system and distributions of the Linux® operating system. Additional examples of operating system 715 include custom operating systems for gaming consoles, including the custom operating systems for systems such as the Microsoft Xbox 360®, Nintendo Wii® and Sony PlayStation® 3.

Additionally, the client systems 810 each are coupled to display devices 840 and input devices 845. The display devices 840 may include output devices such as monitors, touch screen displays, and so on. For instance, the display devices 840 may include a display device used to visually depict a virtual environment. As an example, the display 840 may provide a touch sensitive surface allowing the user to select different locations within the virtual environment and control the movement of an avatar within the virtual environment. The input devices 845 represent a wide variety of input devices, including keyboards, mice, controllers, and so on. Furthermore, the input devices 845 may include a set of buttons, switches or other physical device mechanisms for controlling the client system 810. For example, the input devices 845 could include a set of directional buttons used to navigate an avatar through a virtual environment presented on the display 840.

As shown, the server system 850 includes, without limitation, a processor 855, which obtains instructions and data via a bus 860 from a memory 870 and storage 865. Processor 855 is a programmable logic device that performs instruction, logic, and mathematical processing, and may be representative of one or more CPUs. Storage 865 is representative of hard-disk drives, flash memory devices, optical media and the like. Generally, the storage 865 stores application programs and data for use by the server system 850. The server system 850 is operably connected to the network 880, e.g., via a network interface.

The memory 870 is any memory sufficiently large to hold the necessary programs and data structures. Memory 870 could be one or a combination of memory devices, including Random Access Memory, nonvolatile or backup memory (e.g., programmable or Flash memories, read-only memories, etc.). In addition, memory 870 and storage 865 may be considered to include memory physically located elsewhere; for example, on another computer coupled to the server system 850 via bus 860. The memory 870 includes a game server 150 and an operating system ("OS") 875. Operating system 875 is software used for managing the operation of the server system 850. Examples of OS 875 include UNIX, versions of the Microsoft Windows® operating system and distributions of the Linux® operating system. Additional examples of operating system 875 include custom operating systems for gaming consoles, including the custom operating systems for systems such as the Microsoft Xbox 360®, Nintendo Wii® and Sony PlayStation® 3.

The game server, in turn, contains an avatar positioning component 160. As discussed above, upon receiving a request to move a first avatar to a first location, the avatar positioning component 160 may determine a second location at which to display the first avatar to other users of the virtual world. That is, the avatar positioning component 160 may identify a zone encompassing the first location and determine a second location within the identified zone at which to display the first avatar. The avatar positioning component 160 may determine the second location using a variety of techniques. Examples of such techniques include random selection, pseudo-random selection, selection from a predefined list of locations, and so on. After the second location is determined, the avatar positioning component 160 may output for display (e.g., through the game client 120 and ultimately on the display device 840) the virtual world with the first avatar positioned at the determined second location to the other users of the virtual world. Advantageously, doing so prevents the first avatar from participating in any formations of avatars that give the appearance of offensive content when viewed by users of the virtual world.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., a game server 150 configured with an avatar positioning component 160) or related data available in the cloud. For example, the avatar positioning component 160 could execute on a computing system in the cloud and receive a request from a user to move to user's avatar to a specified location (e.g., from a game client 120 associated with the user). In such a case, the avatar positioning component 160 could determine a zone that encompasses the specified location and could select a second location within the zone at which to display the user's avatar to other users in the virtual world. Doing so prevents users from creating formations of avatars within the virtual world that have the appearance of offensive content when viewed by another user accessing the virtual world from a computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special-purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of controlling avatar positioning within a virtual environment, comprising:
   determining an avatar positioning policy for preventing arrangements of avatars in the virtual environment;
   dividing the virtual environment into a plurality of zones, wherein each zone of the plurality of zones corresponds to a respective exclusive portion of the virtual environment;
   receiving a request, from a first client device associated with a first set of user credentials, to move a first user-controlled virtual object within the virtual environment to a first location that is currently unoccupied by any virtual objects;
   responsive to the request:
      selecting, by an avatar positioning component, a zone from the plurality of zones, based on a determination that the respective exclusive portion of the virtual world for the selected zone encompasses the first location;
      determining, by the avatar positioning component, a second location within the selected zone according to the avatar positioning policy and that is different than the first location, the determining comprising at least one of: (i) randomly selecting the second location within the selected zone and (ii) pseudo-randomly selecting the second location within the selected zone;
      outputting the virtual environment for display, at the first client device from which the request was received, in a manner showing the first user-controlled virtual object positioned at the requested first location; and
      outputting the virtual environment for display, at a second client device distinct from the first client device and associated with a second set of user credentials, in accordance with the avatar positioning policy, such that the first user-controlled virtual object is positioned at the determined second location within the virtual environment, rather than the requested first location.

2. The method of claim 1, wherein the first location and the second location are different locations within the virtual environment, and wherein the first client and the second client are associated with different users.

3. The method of claim 1, wherein determining the second location within the identified zone further comprises:
   identifying one or more prohibited areas within the identified zone; and
   randomly selecting the second location within the identified zone and outside of the identified one or more prohibited areas.

4. The method of claim 1, wherein the first user-controlled virtual object is an avatar controlled by a first user.

5. The method of claim 1, wherein the request is received from a first user, and further comprising:
   identifying a relationship between the first user and a third user of the virtual environment; and
   outputting the virtual environment for display, at a third client device associated with the third user, in a manner showing the first user-controlled virtual object positioned at the first location within the virtual environment, based on the identified relationship between the users.

6. A non-transitory computer-readable medium containing a program that, when executed, performs an operation for controlling avatar positioning within a virtual environment, the operation comprising:
   determining an avatar positioning policy for preventing arrangements of avatars in the virtual environment;
   dividing the virtual environment into a plurality of zones, wherein each zone of the plurality of zones corresponds to a respective exclusive portion of the virtual environment;
   receiving a request, from a first client device associated with a first set of user credentials, to move a first user-controlled virtual object within the virtual environment to a first location that is currently unoccupied by any virtual objects;
   responsive to the request:
      selecting, by an avatar positioning component, a zone from the plurality of zones, based on a determination that the respective exclusive portion of the virtual world for the selected zone encompasses the first location;
      determining, by the avatar positioning component, a second location within the selected zone according to the avatar positioning policy and that is different than the first location, the determining comprising at least one of: (i) randomly selecting the second location within the selected zone and (ii) pseudo-randomly selecting the second location within the selected zone;
      outputting the virtual environment for display, at the first client device from which the request was received, in a manner showing the first user-controlled virtual object positioned at the requested first location; and
      outputting the virtual environment for display, at a second client device distinct from the first client device and associated with a second set of user credentials, in accordance with the avatar positioning policy, such that the first user-controlled virtual object is positioned at the determined second location within the virtual environment, rather than the requested first location.

7. The non-transitory computer-readable medium of claim 6, wherein the first location and the second location are different locations within the virtual environment, and wherein the first client and the second client are associated with different users.

8. The non-transitory computer-readable medium of claim 6, wherein determining the second location within the identified zone further comprises:
   identifying one or more prohibited areas within the identified zone; and
   randomly selecting the second location within the identified zone and outside of the identified one or more prohibited areas.

9. The non-transitory computer-readable medium of claim 6, wherein the first user-controlled virtual object is an avatar controlled by a first user from which the request is received.

10. The non-transitory computer-readable medium of claim 6, wherein the request is received from a first user, and the operation further comprising:
   identifying a relationship between the first user and a third user of the virtual environment; and
   outputting the virtual environment for display, at a third client device associated with the third user, in a manner showing the first user-controlled virtual object positioned at the first location within the virtual environment, based on the identified relationship between the users.

11. A system, comprising:

a processor; and a memory containing a program that, when executed on the processor, performs an operation for controlling avatar positioning within a virtual environment, the operation comprising:

determining an avatar positioning policy for preventing arrangements of avatars in the virtual environment;

dividing the virtual environment into a plurality of zones, wherein each zone of the plurality of zones corresponds to a respective exclusive portion of the virtual environment;

receiving a request, from a first client device associated with a first set of user credentials, to move a first user-controlled virtual object within the virtual environment to a first location that is currently unoccupied by any virtual objects;

responsive to the request:

selecting, by an avatar positioning component, a zone from the plurality of zones, based on a determination that the respective exclusive portion of the virtual world for the selected zone encompasses the first location;

determining, by the avatar positioning component, a second location within the selected zone according to the avatar positioning policy and that is different than the first location, the determining comprising at least one of: (i) randomly selecting the second location within the selected zone and (ii) pseudo-randomly selecting the second location within the selected zone;

outputting the virtual environment for display, at the first client device from which the request was received, in a manner showing the first user-controlled virtual object positioned at the requested first location; and outputting the virtual environment for display, at a second client device distinct from the first client device and associated with a second set of user credentials, in accordance with the avatar positioning policy, such that the first user-controlled virtual object is positioned at the determined second location within the virtual environment, rather than the requested first location.

12. The system of claim 11, wherein the first location and the second location are different locations within the virtual environment, and wherein the first client and the second client are associated with different users.

13. The system of claim 11, wherein determining the second location within the identified zone further comprises:

identifying one or more prohibited areas within the identified zone; and randomly selecting the second location within the identified zone and outside of the identified one or more prohibited areas.

14. The system of claim 11, wherein the first user-controlled virtual object is an avatar controlled by a first user.

15. The system of claim 11, wherein the request is received from a first user, and the operation further comprising:

identifying a relationship between the first user and a third user of the virtual environment; and outputting the virtual environment for display, at a third client device associated with the third user, in a manner showing the first user-controlled virtual object positioned at the first location within the virtual environment, based on the identified relationship between the users.

\* \* \* \* \*